US009331907B1

(12) United States Patent
Gerstenberger et al.

(10) Patent No.: US 9,331,907 B1
(45) Date of Patent: May 3, 2016

(54) NETWORK TRAFFIC MONITORING

(75) Inventors: Peter J. Gerstenberger, Arlington, VA (US); Jessica Salomonsky, Richmond, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2698 days.

(21) Appl. No.: 11/156,132

(22) Filed: Jun. 17, 2005

(51) Int. Cl.
*H04L 12/56* (2006.01)
*H04L 12/24* (2006.01)
*H04L 12/26* (2006.01)
*H04L 12/729* (2013.01)

(52) U.S. Cl.
CPC ........ *H04L 41/0813* (2013.01); *H04L 43/0882* (2013.01); *H04L 45/125* (2013.01); *H04L 41/0896* (2013.01)

(58) Field of Classification Search
CPC ............ H04L 41/0813; H04L 43/0882; H04L 45/125; H04L 41/0896
USPC ........... 709/223, 224; 715/736; 370/228, 235, 370/252, 329, 238; 379/112.06
See application file for complete search history.

(56) References Cited

U.S. PATENT DOCUMENTS

| 5,867,483 | A  | * | 2/1999  | Ennis et al. .................... 370/252 |
| 6,209,033 | B1 | * | 3/2001  | Datta et al. .................... 709/224 |
| 6,697,333 | B1 | * | 2/2004  | Bawa et al. .................... 370/238 |
| 6,744,727 | B2 | * | 6/2004  | Liu et al. ........................ 370/228 |
| 7,219,300 | B2 | * | 5/2007  | Arquie et al. .................. 715/736 |
| 7,676,032 | B2 | * | 3/2010  | Mark et al. ............... 379/112.06 |
| 2001/0047409 | A1 | * | 11/2001 | Datta et al. .................... 709/224 |
| 2005/0223089 | A1 | * | 10/2005 | Rhodes ......................... 709/223 |
| 2006/0002297 | A1 | * | 1/2006  | Sand et al. .................... 370/235 |
| 2006/0050665 | A1 | * | 3/2006  | Bruckman ..................... 370/329 |

OTHER PUBLICATIONS

C. Groves et al., RFC 3525, Gateway Control Protocol Version 1, Jun. 2003, published by the Internet Society of Reston, Virginia, and available on the world wide web (presently via the faqs.org web site).

* cited by examiner

*Primary Examiner* — Mark Rinehart
*Assistant Examiner* — Gbemileke Onamuti

(57) ABSTRACT

A first set of bandwidth utilization data comprising a bandwidth utilization for one or more links in a network is determined. Also, a second set of bandwidth utilization data comprising a bandwidth utilization for one or more media paths in the network is determined. At least some of the first set of bandwidth utilization data is compared to at least some of the second set of bandwidth utilization data, thereby providing information useful for monitoring the network.

15 Claims, 7 Drawing Sheets

NETWORK TRAFFIC MONITORING

BACKGROUND

In recent years, Voice over Internet Protocol (VoIP) has become increasingly popular for telephony communications. With this increasing popularity has come greater usage of the capacity of data networks for VoIP calls. Further, VoIP calls require relatively large amounts of bandwidth in a data network. It is therefore not surprising that data networks used for VoIP calls are more and more frequently operated at, and sometimes beyond, full capacity. Unfortunately, ways to measure the flow of data traffic through a network have not kept pace with the increased usage of VoIP communications. As discussed below, there is a need for improved systems and methods for measuring the bandwidth consumed by VoIP network traffic.

Indeed, assessments of call flows, including predictions relating to bandwidth consumption, are an important part of the network planning process that occurs before a network ever becomes operational. However, such assessments must be validated periodically, preferably on an ongoing basis, once a network becomes operational. In particular the load on each link in a network, i.e., the amount of bandwidth being consumed on each link compared to the amount of bandwidth available on the link, would be of great interest to a network operations center (NOC). Similarly, of great interest to the NOC would be the total amount of traffic being sent between two endpoints. Accordingly, being able to determine the bandwidth consumed by endpoint to endpoint call flows, and the loads these call flows place on the network, would be a valuable aid for successful network operation. Further, determining the bandwidth consumed by call flows would be useful for exploiting the deployed bandwidth capacity put into service in the network. As merely one example, such information would allow a network operator to more efficiently manage the network, including determining what parts of the network are being under-utilized and what parts of the network are in danger of being used beyond capacity.

As is well known, multiple network layers are used to transport data such as VoIP data. Those skilled in the art will understand that higher level network layers necessarily obtain information regarding network status, including utilization, from lower level network layers. Unfortunately, the present ability of Internet Protocol (IP) networks to communicate network status to the voice switching network layer and its call control plane is not well developed. As a result, NOCs must closely monitor the live IP network status that supports a network of softswitches in order to maintain service as intended. Presently, NOCs obtain information regarding network status in two ways. First, present mechanisms for monitoring the network may involve gathering network link and element status by means of Simple Network Management Protocol (SNMP) traps and gets. Such information may be used to populate alarm screens or network maps on a real-time or near real-time basis. Second, real-time or near real-time reports may be available for the softswitch as well. These reports may provide a running count of active calls (and/or signaled calls not yet active) intended for a VoIP network exclusively between softswitches and their media gateways, e.g., gateways between softswitches and other networks such as the Public Switched Telephone Network (PSTN).

Unfortunately, neither of the two ways of reporting on a network's status discussed above integrate and reconcile live IP network status with the live presented IP call loads from the voice switch media gateways that are connected at the edge of the IP network. Further, these presently available reports do not provide an understanding of call flows within the context of the current IP network configuration, nor do they present call flows in terms of the utilization bandwidth they consume aggregated according to the IP Wide Area Network (WAN) links involved. That is, presently available systems and methods do not examine the consequences to actual network IP routing conditions arising from routing such flows between their endpoints in the network. In sum, packet networks such as IP networks tend to be seen as "clouds" precisely because data flows, and the links that are used to transport data, are often too difficult to determine.

Accordingly, there is a need for improved ways for determining loads in a network carrying VoIP data traffic, both from the perspective of the load on individual links, as well as from the perspective of the overall load between two endpoints, e.g., two softswitches separated by two or more links. In particular, it would be desirable to provide a real time, unified visual view of a VoIP network that includes the status of network elements, e.g., information regarding whether each node was available, whether each link was available, and the utilization of each link. It would further be desirable, when viewing information regarding the utilization of a link, to be able to obtain real-time or near real time reporting on the traffic using the link to a first endpoint from a second endpoint. Such reporting capabilities would advantageously provide the ability to generate real-time or near real-time alarms upon the failure or potential over-utilization of a link. Such reporting capabilities would further advantageously provide the ability to generate recommendations for controlling and routing voice data received at endpoints based on failures and/or high utilizations in the IP network.

DETAILED DESCRIPTION OF THE PREFERRED EMBODIMENTS

Figure 1:
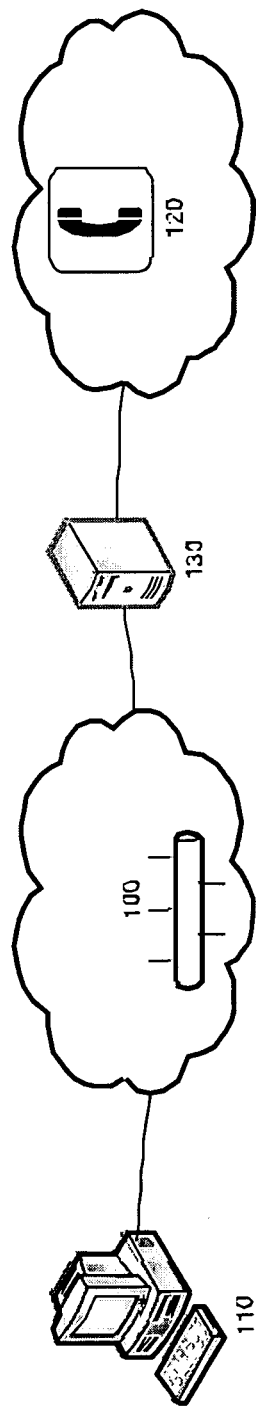
FIG. 1 is a block diagram of a network monitoring system, according to an embodiment.

FIG. 1 is a block diagram of a network monitoring system, according to an embodiment. A packet-switched network 100 is monitored by a computer 110. The network 100 is an IP network, e.g., a network used to transport data for VoIP calls. One or more circuit-switched networks 120 such as the Public Switched Telephone Network (PSTN) access the network 100 via one or more softswitches 130. Accordingly, it should be understood that network 100 may be used for calls made and/or received in a circuit-switched network 120, and also may be used for calls made and/or received in packet-switched network 100. Also, although certain embodiments are discussed herein with reference to network 100 transporting VoIP calls, it should be understood that embodiments could be practiced with respect to the transport of any data packets in a packet network 100. The operation and various elements of network 100 are described in more detail below.

Computer 110 is coupled to network 100. Computer 110 may be any one of a number of computing devices known to those skilled in the art, and may employ any of a number of computer operating systems known to those skilled in the art, including, but by no means limited to, known versions and/or varieties of the Microsoft Windows® operating system, the Unix operating system, and the Linux operating system. Those skilled in the art will recognize that the various processes described herein may be implemented as instructions executable by one or more computers 110. In general, a processor (e.g., a microprocessor) receives instructions, e.g., from a memory, a computer-readable medium, etc., and executes these instructions, thereby performing one or more processes, including one or more of the processes described herein. Such instructions may be stored and transmitted using a variety of known computer-readable media.

A computer-readable medium includes any medium that participates in providing data (e.g., instructions), which may be read by a computer 110. Such a medium may take many forms, including, but not limited to, non-volatile media, and volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

As mentioned above, circuit-switched network 120 may be one or more circuit switched network known to those skilled in the art, e.g., the PSTN.

Softswitch 130 may comprise one or more devices configured to perform call control and switching functions as part of a VoIP network. In the preferred embodiment, softswitch 130 may include facilities for bridging packet-switched network 100 and circuit-switched network 120, such that data from one network 100 or 120 may be transported on the other network 100 or 120. Generally, but not necessarily, a softswitch 130 may comprise a combination of media gateways and media gateway controllers (MGCs) such as are known to those skilled in the art. Softswitch 130 may operate according to one or more protocols known to those skilled in the art. Megaco 1.0, described in C. Groves et al., RFC 3525, Gateway Control Protocol Version 1, June 2003, published by the Internet Society of Reston, Va., and available on the world wide web (presently via the faqs.org web site), fully incorporated herein by reference in its entirety, is one such protocol; others will be known to those skilled in the art. Softswitch 130 may include other devices useful for VoIP call processing, as known to those skilled in the art.

Figure 2:
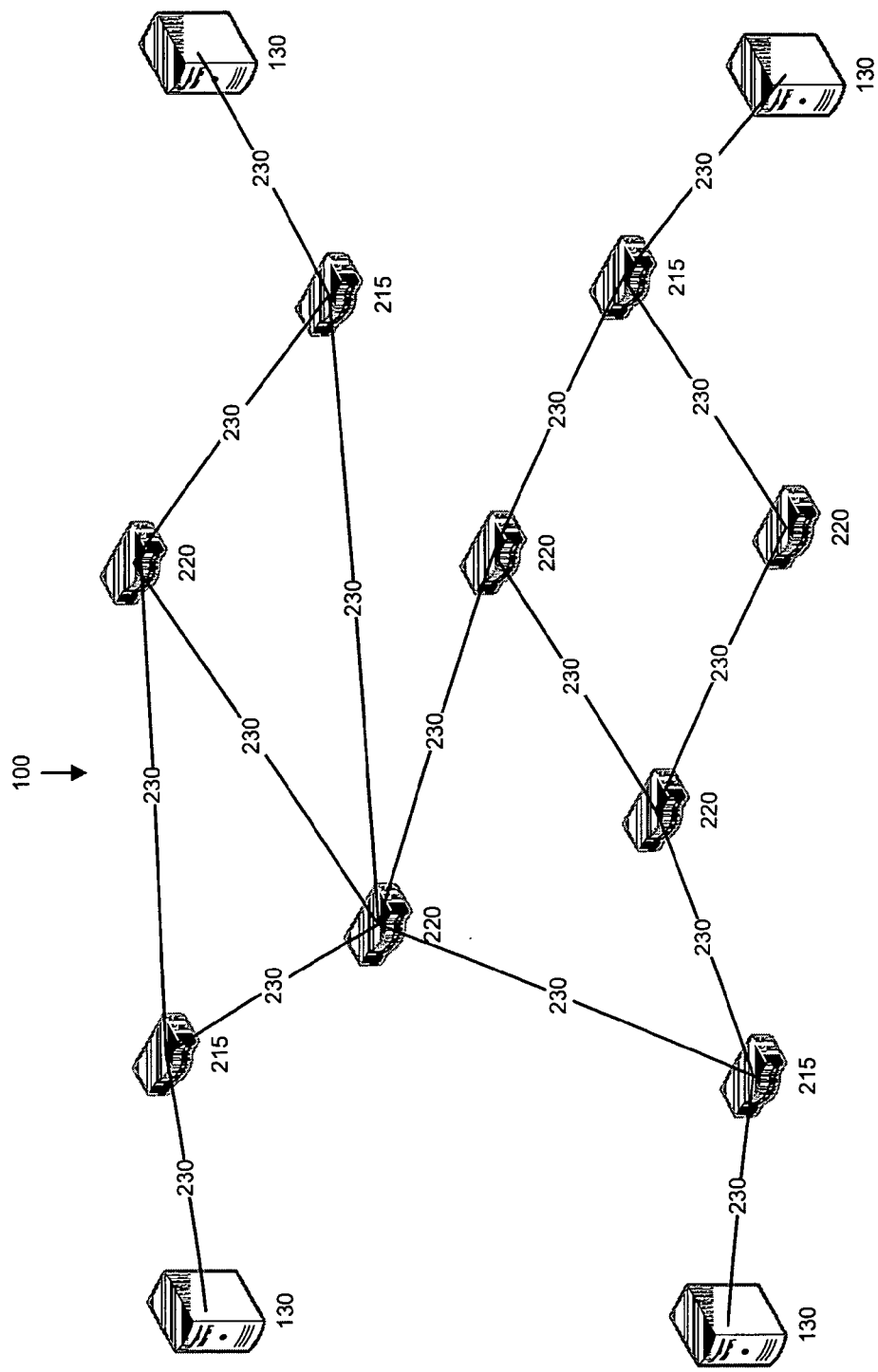
FIG. 2 illustrates certain elements of a packet-switched network for transporting data for VoIP calls, according to an embodiment.

FIG. 2 illustrates certain elements of the packet-switched network 100 for transporting data for VoIP calls, according to an embodiment. Network 100 includes network elements such as softswitches 130 and IP routers 215 and 220. Routers 215 and 220 are computer-based switching systems such as are known to those skilled in the art that are used for routing VoIP call traffic across an IP network. Routers 215 and 220 in general are structurally and functionally identical, but are referred to separately herein to distinguish between a router 215 that is connected to a softswitch 130 and is an endpoint for a VoIP call, and a router 220 that is used to route traffic for the VoIP call as it acts as a transit node for traffic. However, a router 215 shown here as an endpoint for a VoIP call may also be used to route data to and from other endpoints. Accordingly, data packets travel from a first softswitch 130 via links 230 through one or more routers 215 and 220 to reach their final destination in the network 100, i.e., a router 215 associated with a second softswitch 130.

Figure 3:
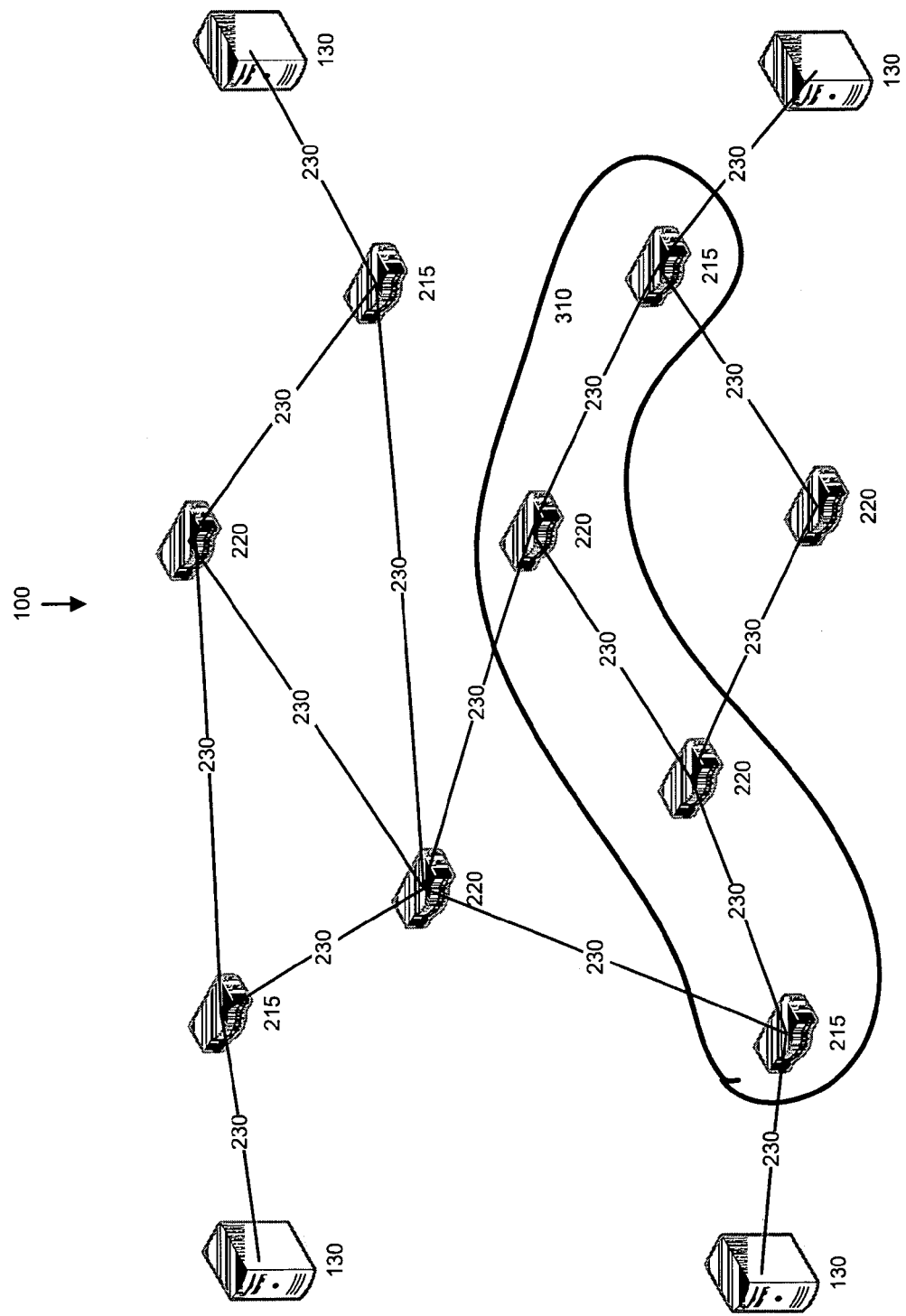
FIG. 3 illustrates a network with one possible media path between two endpoints, according to an embodiment.

As should be clear from FIG. 2, there are many different routes in the network 100 that a data packet could take to get from a first softswitch 130 to a second softswitch 130. Accordingly, FIG. 3 shows network 100 with one possible media path 310 between two endpoints 215, according to an embodiment. Media path 310 is sometimes referred to as an A to Z path 310. As discussed below, for any media path 310, it will be of interest to determine the load conditions on each link 230 in the path 310. Further, it will be of interest to determine all possible A to Z paths 310 between two endpoints 215 in the event that a link 230 on a first A to Z path 310 is unavailable or over-utilized so that data traffic may be routed to a second path 310 having links 230 with extra capacity.

Figure 4:
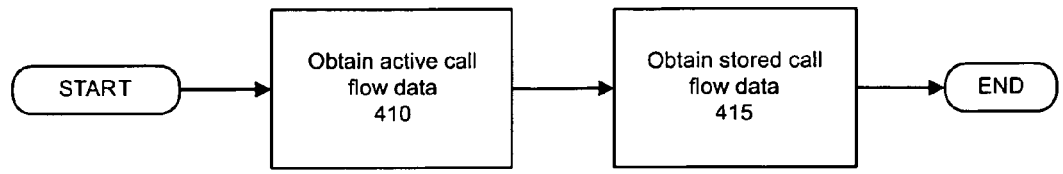
FIG. 4 illustrates a high level process flow for obtaining information about loads in a network, according to an embodiment.

FIG. 4 depicts a high level process flow for obtaining information about loads in a network 100 according to an embodiment.

In step 410, active call flow data is obtained from each softswitch 130 that is of interest. In some embodiments, every router 215 and 220 in a network 100 is of interest. However, it is of course possible to obtain active call flow data only from routers 215 and 220 that warrant monitoring, for example, routers that, based on prior usage patterns, are known to be likely to have bandwidth utilizations near or exceeding their capacities, routers in media paths 310 that are of interest, etc.

Active call flow data includes information used to calculate a bandwidth utilization rate for a given interface to the routers 215 or 220, i.e., for a given link 230, in terms of bytes per second, percentage of capacity, or some other measure known to those skilled in the art. Generally, active call flow data includes a count of active calls on the softswitches 130 in a given time interval, calls off-hook in a given time interval, etc. Active call flow data could include other parameters, such as calls being attempted, calls blocked, and other parameters that those skilled in the art will recognize are indicators of bandwidth consumption in a network. As the name implies, active call flow data is relevant to how much data is flowing through a router 220 at a given point in time, or for a given time interval. Those skilled in the art will recognize that there are a number of ways in which such data may be obtained, e.g., querying via a command line in a shell, using SNMP, etc. Following step 410, in some embodiments, control proceeds to step 415. In some embodiments, as explained further below, step 415 precedes step 410. In other embodiments, the process described with respect to FIG. 4 includes only step 410 and not step 415.

In step 415, stored call flow data is obtained from each softswitch 130 that is of interest. Stored call flow data generally includes data that is presently stored from a softswitch 130 for billing purposes, such as a count of calls handled by the softswitch 130 within a given time period, along with the network addresses of the softswitches 130 from which each call included in the count of calls originated and ended. As will be seen below, the quantity of calls handled by a softswitch 130 within a given time period may be used to compute the bandwidth in use between two endpoints 215. Following step 415, the process described with respect to FIG. 4 ends. In some embodiments, the process described with respect to FIG. 4 includes only step 415 and not step 410.

In general, it is to be understood that steps 410 and 415 each present ways of deriving data about calls from softswitches 130 and in general it is only necessary to practice one of steps 410 and 415. Step 410, as noted above, includes obtaining data about calls that are currently active. Step 415, on the other hand, includes obtaining data about recent calls that has been stored, e.g., in a softswitch 130. Thus, those skilled in the art will recognize that steps 410 and 415 provide different ways of obtaining essentially the same information, and may be practiced alone or in combination, and in any order.

Figure 5:
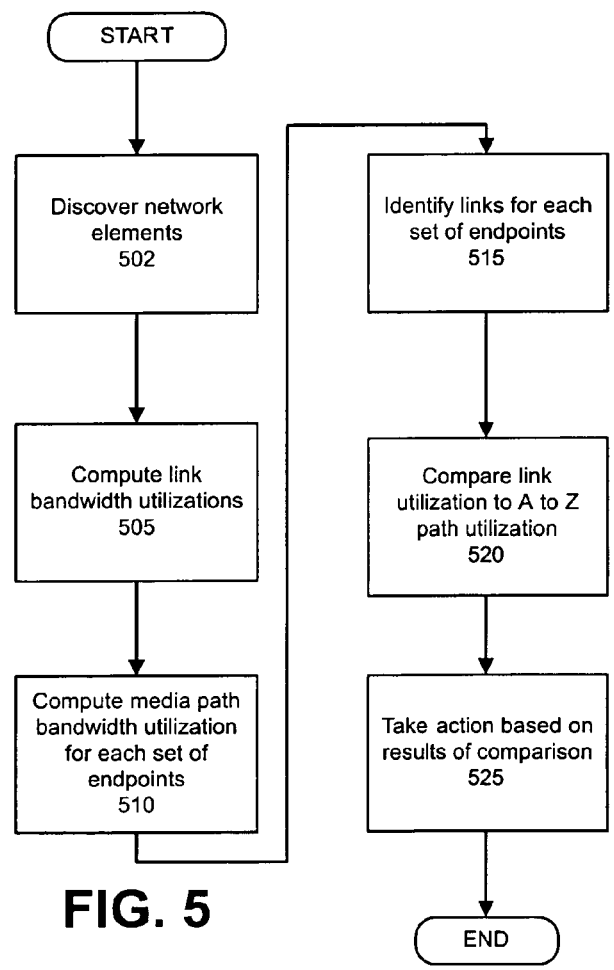
FIG. 5 illustrates a process flow for calculating metrics relating to usage of bandwidth in a network, according to an embodiment.

FIG. 5 depicts a process flow for calculating metrics relating to usage of bandwidth in a network 100, according to an embodiment.

In step 502, network elements, e.g., softswitches 130, routers 215 and 220, and links 230 are discovered. This step of "discovery" could be performed automatically using known mechanisms such as those discussed below, or could be as simple as manually identifying points of interest within the network, that is, predetermining the network addresses, e.g., IP addresses, of network elements to be discovered. As is known and understood by those skilled in the art, by knowing the network address of a network element, it is possible to use known protocols to communicate with the element to retrieve information. Further, in some embodiments network elements are discovered using known protocols such as SNMP as discussed above. Further, use of network daemons to probe links 230 to discover elements 130, 215, and 220 will also be understood by those skilled in the art as a way in which network elements 130, 215 and 220 may be discovered. Based on the discovery, or identification, of network elements, it is further possible to discover the routing configuration of a network 100 to facilitate determining utilization of a media path 310 along with links 230 included in the path 310. Those skilled in the art will recognize that such configuration information may be derived via software emulation or heuristically within a live network 100 using tools that record and report such information, e.g. trace route commands or related methods known to those skilled in the art. Following step 502, control proceeds to step 505.

In step 505, bandwidth utilization for each link 230 is computed based on active call flow data discussed above with respect to step 410. For use later in the process, the bandwidth utilization computed in this step is generally but not necessarily expressed in terms of the percentage of the capacity of the link 230 that is being used. Bandwidth utilization may also be expressed in terms of known measurements such as kilobits per second, etc. Step 505 is generally performed for all links 230 in network 100.

As suggested above in the discussion concerning step 410, embodiments are possible, and in certain cases desirable, in which bandwidth utilization is computed only for selected links 230. Links 230 may be selected based on performance, location between a particular set of endpoints 215, or some other criterion that makes it desirable to monitor a link 230. Following step 505, control proceeds to step 510.

In step 510, bandwidth utilization is computed for each media path 310 in the network 100 being used between a set of endpoints 215, such media paths 310 being determined according to information obtained in step 502 above, along with the destination for a call provided to a router 215 from a softswitch 130 in the network 100. A number of factors are relevant to computing the bandwidth utilization of a media path 310. First, it is necessary to calculate the bandwidth consumed by a call on the network 100. This calculation is described below with respect to Equations (1) and (2).

To determine the bandwidth for a call, it is necessary to account for the sampling rate of the voice data, determined by the coder/decoder (codec) standard being used in the network 100. For example, the G.711 standard promulgated by the International Telecommunications Union is frequently used in IP networks, and specifies a sampling rate of 64 kilobytes per second, or 8 bytes per millisecond. Also relevant to bandwidth utilization is the packet framing interval, known to those skilled in the art.

Further, those skilled in the art will be aware that certain layers in a network 100 require bandwidth for overhead when transmitting a packet. Bandwidth required for overhead is another factor that should be accounted for when computing the bandwidth consumed by a VoIP call. For example, those skilled in the art will recognize that a network 100 for transporting VoIP data is likely to employ Real-Time Transport Protocol (RTP) over User Datagram Protocol (UDP) as layer 4 protocols above the IP layer, and that the overhead required by UDP/RTP for a VoIP call is 40 bytes inclusive of the IP header typically. Similarly, those skilled in the art will recognize that network 100 is likely to employ Ethernet, among other data link protocols, as a layer 2 architecture in many instances, and that the overhead required by Ethernet for a VoIP call is approximately 38 bytes. Other layer 2 protocols when also present would need to be accounted for similarly.

In Equation (1) below, the bandwidth required for a VoIP call is represented as B, S represents the sampling rate of voice data in the network 100 in bits per millisecond, F represents the framing interval in milliseconds, $O_{L3}$ represents network layer 3 packet overhead in bits, and $O_{L2}$ represents network layer 2 packet overhead in bits.

$$B = SF + O_{L3} + O_{L2} \qquad \text{Equation (1)}$$

Applying Equation (1) to the hypothetical set of data discussed above provides the following result:

$$B = 8 \frac{\text{bytes}}{\text{ms}} \cdot \frac{10 \text{ ms}}{10 \text{ ms}} + \frac{40 \text{ bytes}}{10 \text{ ms}} + \frac{38 \text{ bytes}}{10 \text{ ms}}$$

$$B = 158 \frac{\text{bytes}}{10 \text{ ms}}$$

$$B = 1264 \frac{\text{bits}}{\text{ms}}$$

$$B = 126.4 \text{ Kbps}$$

It should be understood that Equation (1), and the hypothetical data set to which Equation (1) is applied above, is presented for purposes of illustration only, and that embodiments are possible, even likely, in which Equation (1) and/or the exemplary data set to which Equation (1) is applied in the example above, is varied or departed from altogether. For example, other available data that might be factored into an equation such as Equation (1) includes the number of calls that have been initiated for network 100 but without a media session yet established. Further, the statistical average number of blocked calls or dropped calls experienced by a softswitch 130 might also be gathered and used to impart a modifying coefficient to decrease the bandwidth consumed per call calculated in Equation (1). Another example of useful data includes data captured from optional transmission settings for a call such as whether or not "silence suppression" i.e., voice activity detection (VAD) was used on a call, so that the number of such calls can be quantified. Related to information regarding VAD would be capturing or being aware of attending "keep alive" streams used during periods of speaker inactivity on a given call.

Further, an amount of bandwidth accounting for actual or estimated signaling overhead should generally be added to the result of Equation (1). Those skilled in the art will recognize that it is possible to calculate an actual bandwidth consumed by signaling overhead. Such calculations, however, can require the accumulation of many details. Thus, it is often easier simply to estimate signaling overhead, sometimes using information provided by a switch manufacturer. Accordingly, in Equation (2) below, B represents the bandwidth determined, in Equation (1), $P_S$ represents a percentage of bandwidth estimated to be consumed by signaling overhead, and $B_T$ represents a total amount of bandwidth consumed after an adjustment has been made to account for the estimate of signaling overhead.

$$B_T = B + BP_S \qquad \text{Equation (2)}$$

In one embodiment, signaling overhead $P_S$ is estimated to be five percent of the bandwidth being consumed by a call on the network 100. In another embodiment, signaling overhead $P_S$ is estimated to be ten percent of the bandwidth being consumed by a call on the network 100, this estimate being deliberately made to be higher than the actual signaling overhead is believed to be. For example, assuming the result of Equation (1) above was that B is 126.4 Kbps, a signaling overhead of five percent would result in total bandwidth $B_T$ being 132.72 Kbps. Those skilled in the art will recognize that data for estimating signaling overhead $P_S$ is often provided by the manufacturers of softswitches 130.

In general, any data flow whose quantity of traffic depends on a number and type of established or initiated user sessions could be factored into an equation such as Equation (1). Information about such data flows may be based on mathematical assumptions that could be derived from parameters and call quantities discussed above; such information may also be derived from actual packet counts as well that might come from softswitches 130 or routers in the network 210 and 215.

Returning to FIG. 5, it should be understood that step 510 may be performed with respect to all or some pairs of endpoints 215, i.e., some or all A to Z paths 310 in the network 100. If step 510 is not performed for all pairs of endpoints 215, it may be performed with respect to a predetermined set of endpoints 215, identified because the A to Z path(s) between the endpoints 215 are known to ensure heavy traffic loads or have other issues requiring monitoring. However, it is also possible to identify endpoints 215 in real time or near real time according to active call flow data discussed above. For example, if an endpoint 215 is experiencing a number of active calls above a certain threshold, the process could be configured to perform step 510 for all A to Z paths 310 beginning or terminating with the endpoint 215. Following step 510, control proceeds to step 515.

In step 515, using information obtained in step 502 above, the set of all links 230 between each set of endpoints 215 in network 100 is identified. The set of links 230 for a set of endpoints 215 is identified by determining all A to Z paths 310 between the two endpoints 215, and including all links 230 in the determined A to Z paths 310 in the set of links 230 associated with the endpoints 215. As described above with reference to step 505, a bandwidth utilization will have been calculated for each link 230. Following step 515, control proceeds to step 520.

In step 520, for each set of endpoints 215 for which an A to Z path 310 bandwidth utilization $B_T$ was computed in step 510, a comparison is performed of the A to Z path 310 bandwidth utilization $B_T$ to the bandwidth utilization for each link 230 identified as being in the set of links 230 between the two endpoints 215 in step 515 above. This comparison may take a number of different forms, including but not limited to comparing the path 310 bandwidth utilization $B_T$ to the utilization of the link 230. If the utilization of the link 230 is high, but the path 310 bandwidth utilization $B_T$ is low, it may be desirable to re-route traffic using the link 230 to other links 230 in the path or paths 310 using the link 230. Conversely, if the utilization of the link 230 is low, but the path 310 bandwidth utilization $B_T$ is high, it may be desirable to re-route traffic from other links 230 to the link 230 having low bandwidth utilization so that calls on the path 310 are not impeded or prevented by network congestion.

Accordingly, some embodiments include comparing the utilization rates of individual links 230 in a set of links 230 for a given path 310. The results of such comparison can then be used to aid in determining whether and how to re-route data traffic from one link 230 to another link 230. That is, where a first link 230 has a low utilization rate and a second link 230 has a high utilization rate, a NOC may wish to route traffic from the second link 230 to the first link 230. Following step 520, control proceeds to step 525.

In step 525, an action may be taken based on the results of the comparison performed in step 520. For example, if an A to Z path 310 has high bandwidth utilization $B_T$, and includes a link 230 also having a high utilization rate, in some embodiments a warning will be provided. In other embodiments, traffic may be automatically re-routed from the link 230 having a high utilization rate to another link 230 having a lower utilization rate in the path 310. In this way, network outages and degradations in network service can be minimized or avoided. Following step 525, the process described with respect to FIG. 5 ends.

Note that for any link 230, it should be possible to find the sum $S_B$ of the bandwidth consumed by all call flows through the link 230 at a given time, e.g., $$S_B = \sum_1^n B_T \qquad \text{Equation (3)}$$

where n is the number of active calls using the link 230, and $B_T$ is determined as described above with reference to Equations (1) and (2). The sum $S_B$ calculated for a link 230 should be roughly equivalent to the bandwidth utilization for the link 230 computed as described above regarding step 505 for a particular media path 310 and any other such flows between different softswitch 130 to softswitch 130 pairs, i.e., different media paths 310, whose traffic may happen to converge across this particular link 230 in the network. However, when routers 215 and 220 are part of an integrated network 100 that carries both VoIP and other kinds of data, the sum $S_B$ will likely represent only a subset of the data traveling through a link 230 at a given time, and thus becomes particularly useful as the only representation of the data load on a link 230 resulting from VoIP data. Moreover, even in networks 100 carrying only VoIP data, the sum $S_B$ is useful as a cross-check on the bandwidth utilization computed in step 230.

Figure 6:
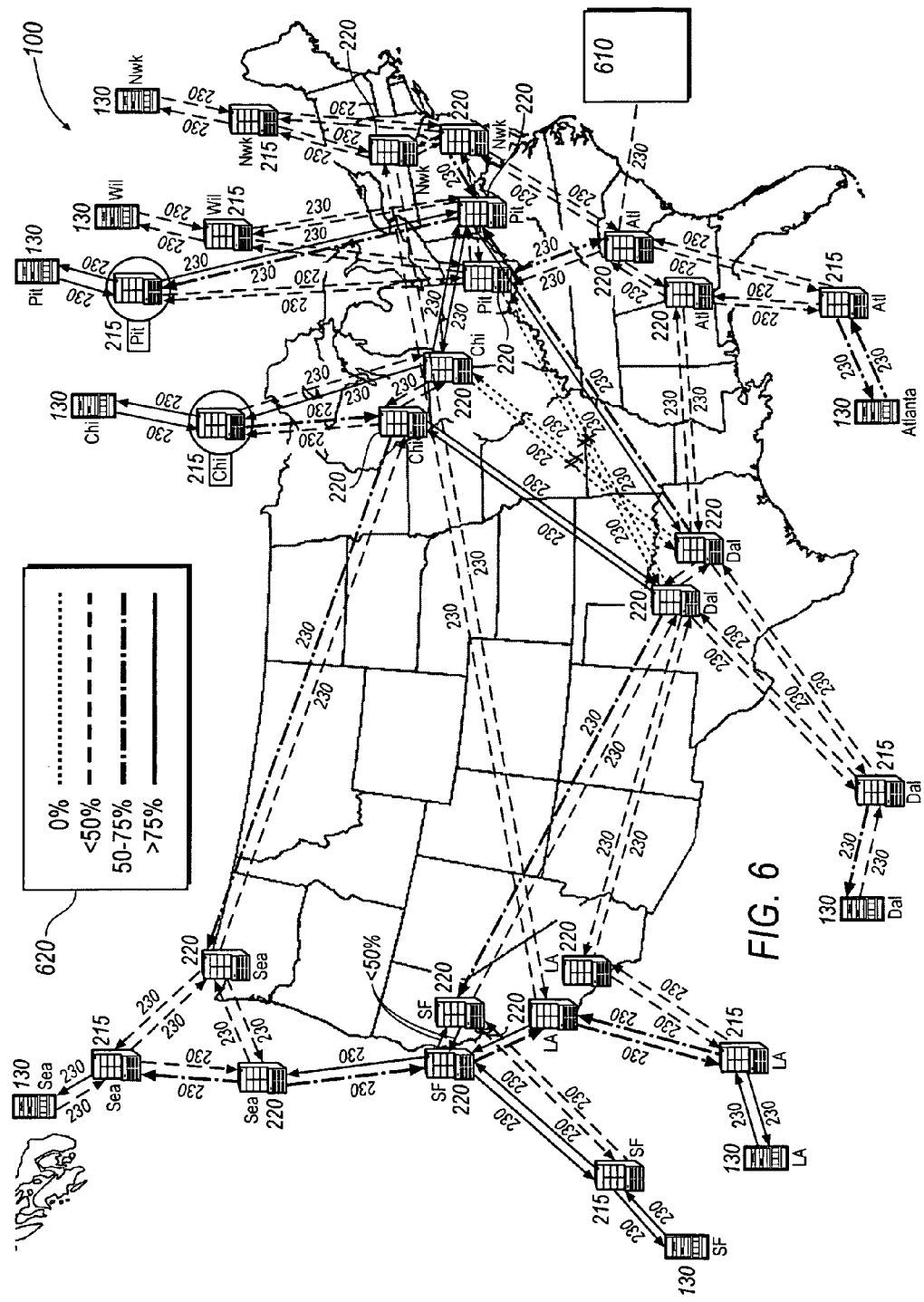
FIG. 6 shows a representation of a graphical user interface (GUI) such as is presented to a user in a network operations center, or other user monitoring a network, according to an embodiment.

FIG. 6 shows a representation of a graphical user interface (GUI) 600 such as is presented to a user in a NOC or other user monitoring a network 100, according to an embodiment. GM 600 provides a graphical representation of a network 100 to enable a user to determine network conditions related to various A to Z paths 310 and links 230. Accordingly, as shown by legend 620, links 230 may be graphically coded, e.g., by color, pattern, etc., to provide an indication of the utilization of each link 230. Further, by selecting a link with a pointing device, such as a mouse, a user may access a pop-up window 610 that provides further information about the link 230, such as a precise figure relating to the bandwidth utilization of the link 230 (e.g., a percentage of capacity used), a list of the A to Z paths 310 that are using the link 230, and a list of suggested actions to take if the utilization of the link 230 is in danger of approaching or exceeding a predetermined or dynamically adjusted threshold. Such a threshold may be percentage based (e.g., a percentage of capacity being utilized) or scalar (e.g., a particular amount of bandwidth being consumed).

Figure 7:
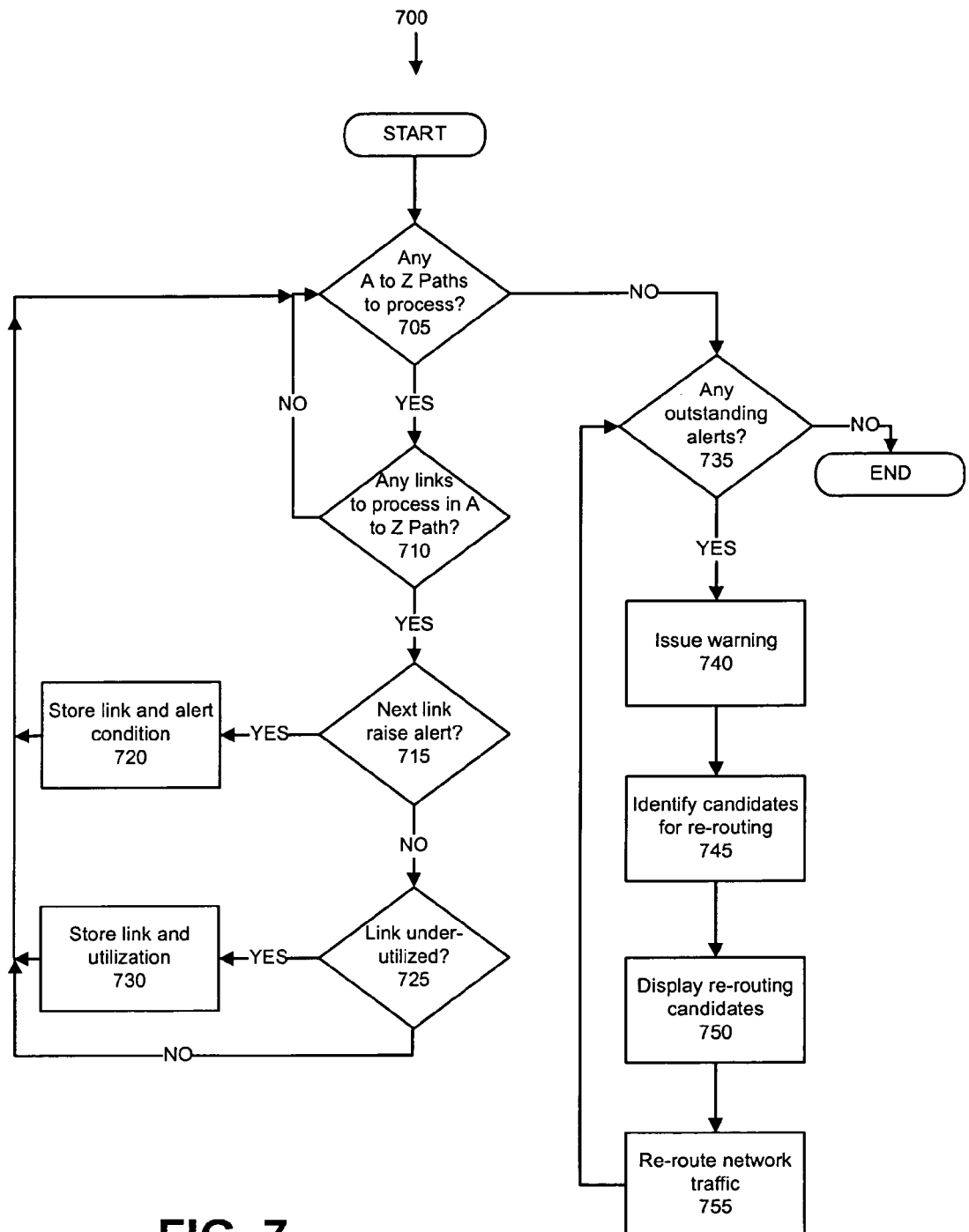
FIG. 7 illustrates a process used in some embodiments for raising alerts or automatically re-routing network traffic based on conditions in a network.

FIG. 7 illustrates a process 700 used in some embodiments for raising alerts or automatically re-routing network traffic based on conditions in a network 100.

In step 705, it is determined whether any A to Z paths 310 in the network 100 remain to be processed. As will be readily apparent, this determination will always be positive for the first iteration of the process 700, and control will proceed to step 710. If the determination of step 705 is negative, control proceeds to step 735, discussed below.

In step 710, it is determined whether any links 230 in the A to Z path 310 remain to be processed. This determination will be positive for the first time this step is visited for any path 310, in which case control proceeds to step 715. Otherwise, control returns to step 705.

In step 715, the bandwidth utilization of an unprocessed link 230 identified in step 710 is determined, for example, as described above with reference to step 505 shown in FIG. 5. If the bandwidth utilization of the link 230 surpasses a threshold, then an alert condition is indicated, and control proceeds to step 720. Otherwise, control proceeds to step 725. The threshold applied in step 715 may be a predetermined threshold and may be the same for all links 230 in a network 100 or may be different for different links 230. In general, it is to be understood that the threshold of step 715 may be manually or dynamically configured according to one or more factors such as the location of the link 230 in the network 100, known usage patterns for the link 230, bandwidth utilization of the A to Z path 310 determined as described above with reference to step 510 of FIG. 5, etc.

In step 720, the link, and the alert condition associated with the link are stored, e.g., in the memory of a computer 110. Control then returns to step 705.

In step 725, it is determined whether the bandwidth utilization of the link 230 processed in step 715 falls below a threshold, i.e., represents an underutilization of the link 230. The threshold applied in step 725 may be predetermined and may be the same for all links 230 in a network 100 or may be different for different links 230. In general, it is to be understood that the threshold of step 725 may be manually or dynamically configured according to one or more factors such as the location of the link 230 in the network 100, known usage patterns for the link 230, etc. If it is determined that the link 230 is underutilized, then control proceeds to step 730. Otherwise, control returns to step 705.

In step 730, the link, and a flag indicating that the link is underutilized is stored, e.g., in the memory of a computer 110. Control then returns to step 705.

Once it has been determined in step 705 that there are no remaining A to Z paths 310 in network 100 for processing, control proceeds to step 735.

In step 735 it is determined whether there are any outstanding alerts, i.e., whether there are any unprocessed alerts, i.e., alerts stored in step 720 for which warnings have not been presented via a GUI 600 and/or some action taken, e.g., as described above with reference to step 525 shown in FIG. 5. If not, the process 700 ends. Alternatively, in some embodiments (not shown in FIG. 7), control returns to step 705 upon a negative determination in step 735. If there are unprocessed alerts, control proceeds to step 740, in which processing begins with respect to an alert determined in step 735 not to have been processed.

In step 740, a warning is issued based on the alert being processed. Such a warning may be displayed in a pop-up window 610, such as is described above with reference to FIG. 6. However, it should be understood that a warning generated in step 740 could also be sent via e-mail, pager, instant messaging, etc. A warning could alternatively take the form of sounds, e.g., alarm bells, etc., played through a speaker attached to a computer 110. In general, a warning issued in step 740 contains the location of the link 230 to which the warning pertained, as well as the bandwidth utilization of the link 230 and/or an indication regarding the degree to which the link 230 is in danger of exceeding its capacity. Following step 740, control proceeds to step 745.

In step 745, underutilized links stored in step 730 are examined to determine (1) whether any underutilized links 230 are adjacent to the link 230 for which an alert has been raised, i.e., whether any underutilized links 230 are attached to a same router 215 or 220 as the link 230 for which an alert has been raised, and (2) whether any underutilized links 230 are in an A to Z path 310 also served by the link 230 for which an alert has been raised. Any links 230 meeting the preceding two conditions are identified as candidates for re-routing of at least some of the traffic of the link 230 for which an alert has been raised. Following step 745, control proceeds to step 750. Alternatively, in some embodiments (not shown in FIG. 7), control may proceed directly to step 755.

In step 750, the re-routing candidate links 230 identified in step 745 are displayed, e.g., in a window in GUI 600. In some embodiments (not specifically illustrated in FIG. 7), a user accessing a computer 110 can manually select some or all of these candidate links 230 to be used for the re-routing of network traffic, after which control returns to step 735. Following step 750, control proceeds to step 755.

In step 755, a heuristic is applied to re-route network traffic from the link 230 for which an alert has been raised to one or more of the link or links 230 identified as candidates for re-routing in step 745. The heuristic applied in step 755 may have one or more elements, including, for example, selecting only links 230 not associated with paths 310 known to incur high bandwidth utilizations, selecting links 230 whose bandwidth utilization is below a predetermined threshold, comparison of the bandwidth utilization of paths 310 to that of links 230 as is described above with reference to step 520 shown in FIG. 5, etc. It should be understood that this step 755 of re-routing network traffic may be performed automatically, e.g., by computer software implemented on a computer 110, or it may be performed manually by operations personnel in a NOC. Following step 755, control returns to step 735.

Figure 8:
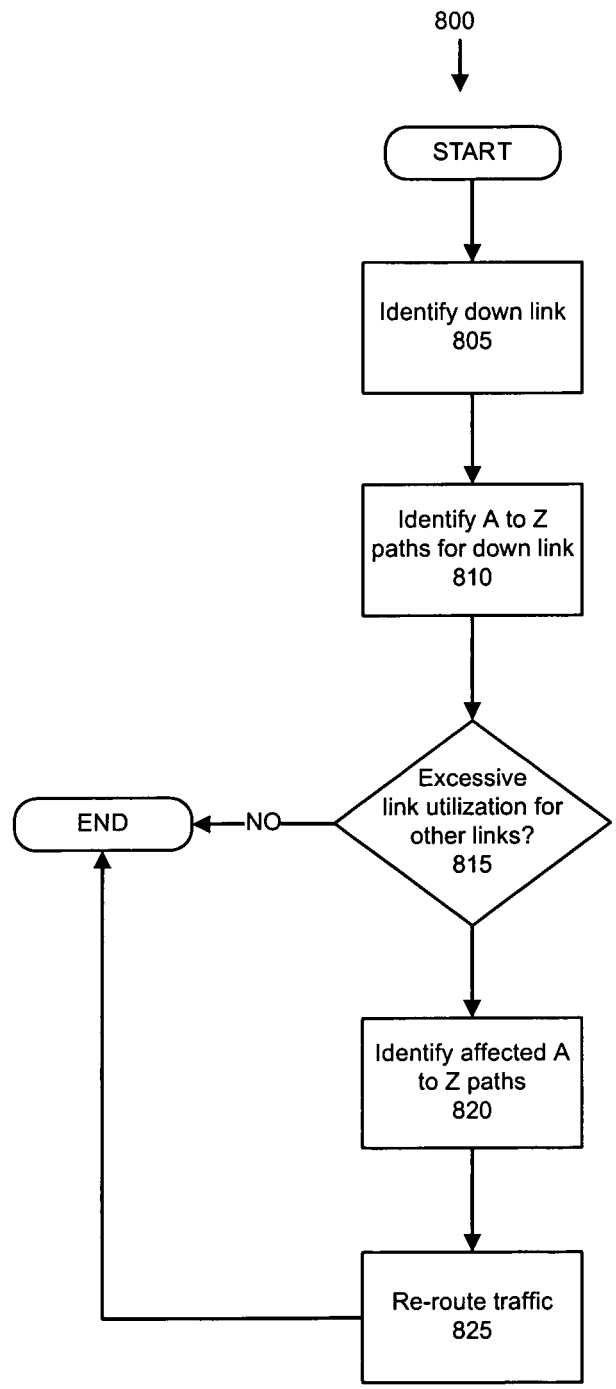
FIG. 8 illustrates a process for addressing the situation in which a link has gone out of service, according to an embodiment.

FIG. 8 illustrates a process for addressing the situation in which a link 230 has gone out of service, according to an embodiment.

In step 805, a link 230 and/or router 215 or 220, e.g., a "down" link 230 or node 215 or 220, is identified. The down link 230 or node 215 or 220 may be identified by a number of mechanisms known to those skilled in the art, including manual input by an operator to a computer 110, a message received in a computer 110 and displayed in a GUI 600, etc. Following step 805, control proceeds to step 810.

In step 810, the A to Z paths 310 including the down link 230 or node 215 or 220 are identified. Following step 810, control proceeds to step 815.

In step 815, the other links 230 in the A to Z paths 310 identified in step 810 are examined to determined if any other links 230 in such paths 310 have suffered from excessive bandwidth utilization due to the outage of the down link 230 or node 215 or 220. If not, the process 800 ends. Otherwise, following step 815, control proceeds to step 820.

This determination of step 815 may be made in a number of ways. For example, it may be that the outage of the down link 230 or node 215 or 220 has resulted in an excessive bandwidth utilization for one or more other links 230 or nodes 215 or 220, such bandwidth utilization being measured as described above with reference to step 505 shown in FIG. 5. Alternatively or additionally, known usage patterns for an A to Z path 310 may be consulted to determine whether links 230 or node 215 or 220 are likely to be adversely affected by the down link 230 or node 215 or 220. Further alternatively or additionally, the current bandwidth utilization for one or more A to Z paths 310 including a link 230 or node 215 or 220 may be analyzed as described above with reference to step 510 shown in FIG. 5.

In step 820, an identification is made of A to Z paths 310 including links 230 or node 215 or 220 identified in step 815. Following step 820, control proceeds to step 825.

In step 825, traffic in a network 100 is re-routed to avoid alleviate disruptions to services caused by down link 230 or node 215 or 220. Various heuristics, such as described above with reference to step 755 shown in FIG. 7, may be applied in step 825. Following step 825, the process 800 ends.

CONCLUSION

With regard to the processes, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the field of network monitoring, and that the disclosed systems and methods will be incorporated into such future embodiments. Further, although embodiments described herein refer to VoIP networks, it should be understood that embodiments applied to other kinds of packet networks will be within the scope and spirit of the presently claimed invention. Accordingly, it should be understood that the invention is capable of modification and variation and is limited only by the following claims.

What is claimed is:

1. A method comprising:
    determining a first set of bandwidth utilization data comprising a bandwidth utilization datum for each of a plurality of links in a network;
    determining a second set of bandwidth utilization data comprising a bandwidth utilization datum for each of one or more media paths in the network, wherein each media path comprises a subset that is more than one, and less than all, of the links in the network; and
    comparing, in a computing device, at least some of the first set of bandwidth utilization data to at least some of the second set of bandwidth utilization data,
    thereby comparing at least one datum for one of the links with at least one datum for a subset of more than one of the links, and thereby providing information useful for monitoring the network, and
    obtaining call flow data from one or more network elements, the call flow data including at least a count of calls in a given time period, wherein the call flow data is used in determining at least one of the first set of bandwidth utilization data and the second set of bandwidth utilization data.

2. The method of claim 1, wherein the call flow data is at least one of active call flow data and stored call flow data.

3. A method comprising the steps of:
    identifying a set of one or more media paths in a network;
    identifying a set of links for each media path in the set of media paths;
    determining a bandwidth utilization of each link in each set of links, thereby generating a first set of bandwidth utilization data comprising a bandwidth utilization for each of the links in the network;
    determining a second set of bandwidth utilization data comprising a bandwidth utilization for one or more media paths in the network;
    determining whether to generate an alert condition for each link based at least in part on (1) the bandwidth utilization information for each link and (2) an estimate of bandwidth utilization for a media path that includes the link; and
    comparing, in a computing device, at least some of the first set of bandwidth utilization data to at least some of the second set of bandwidth utilization data;
thereby providing information useful for monitoring the network.

4. The method of claim 3, further comprising the step of, if an alert condition is generated for a link, issuing a warning for the link.

5. The method of claim 3, further comprising the step of, if an alert condition is generated for a link,
    identifying one or more candidate links for re-routing network traffic; and
    performing at least one of displaying a list of the candidate links in a graphical user interface and re-routing network traffic to at least one of the candidate links.

6. The method of claim 5, further comprising the step of providing for a user input to re-route network traffic in the graphical user interface.

7. The method of claim 3, wherein the set of media paths comprises all media paths in the network.

8. The method of claim 3, wherein each set of links for a media path comprises all links in the media path.

9. The method of claim 3, wherein the estimation is based on call flow data comprising at least one of active call flow data and stored call flow data, the call flow data including at least a count of calls in a given time period, wherein the call flow data is used in determining at least one of the estimation of bandwidth utilization of each link in each set of links and the second set of bandwidth utilization data.

10. A non-transitory computer-readable medium storing computer executable instructions tangibly embodied thereon, the computer-readable medium comprising instructions for:
identifying a set of one or more media paths in a network;
identifying a set of links for each media path in the set of media paths;
determining a bandwidth utilization of each link in each set of links, thereby generating a first set of bandwidth utilization data comprising a bandwidth utilization for each of the links in the network;
determining a second set of bandwidth utilization data comprising a bandwidth utilization for one or more media paths in the network;
determining whether to generate an alert condition for each link based at least in part on (1) the bandwidth utilization information for each link and (2) an estimate of bandwidth utilization for a media path that includes the link; and
comparing, in a computing device, at least some of the first set of bandwidth utilization data to at least some of the second set of bandwidth utilization data;
thereby providing information useful for monitoring the network.

11. The computer-readable medium of claim 10, further comprising instructions for issuing a warning for the link if an alert condition is generated for a link.

12. The computer-readable medium of claim 10, further comprising instructions for, if an alert condition is generated for a link, identifying one or more candidate links for re-routing network traffic; and performing at least one of displaying a list of the candidate links in a graphical user interface and re-routing network traffic to at least one of the candidate links.

13. The computer-readable medium of claim 10, wherein the set of media paths comprises all media paths in the network.

14. The computer-readable medium of claim 10, wherein each set of links for a media path comprises all links in the media path.

15. The computer-readable medium of claim 10, wherein the estimation is based on call flow data comprising at least one of active call flow data and stored call flow data, the call flow data including at least a count of calls in a given time period, wherein the call flow data is used in determining at least one of the estimation of bandwidth utilization of each link in each set of links and the second set of bandwidth utilization data.

* * * * *